Figure 1:
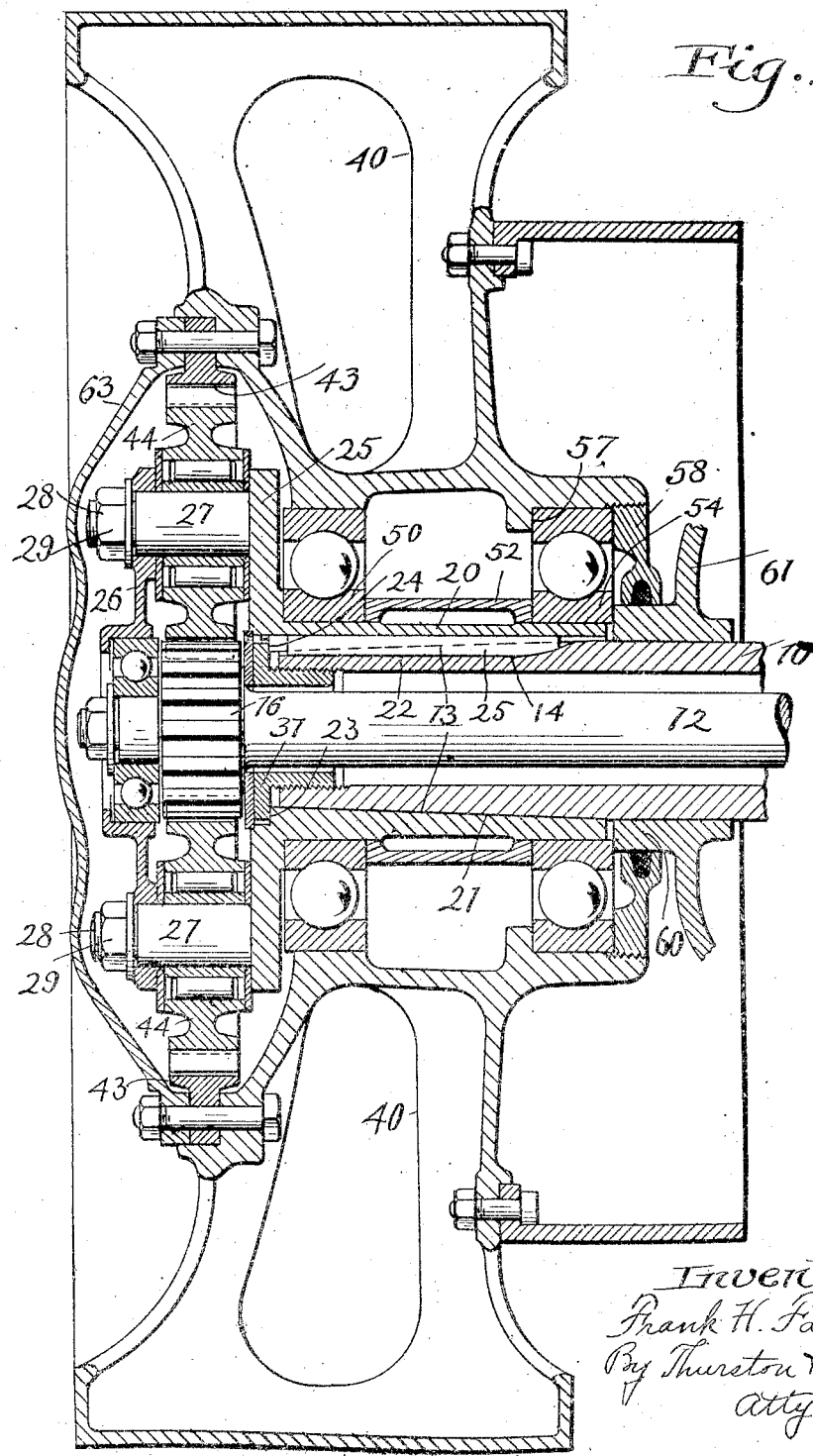

F. H. FARMER.
AUTOMOBILE TRACTION MECHANISM.
APPLICATION FILED JUNE 11, 1917.
1,305,452.
Patented June 3, 1919.
2 SHEETS—SHEET 2.
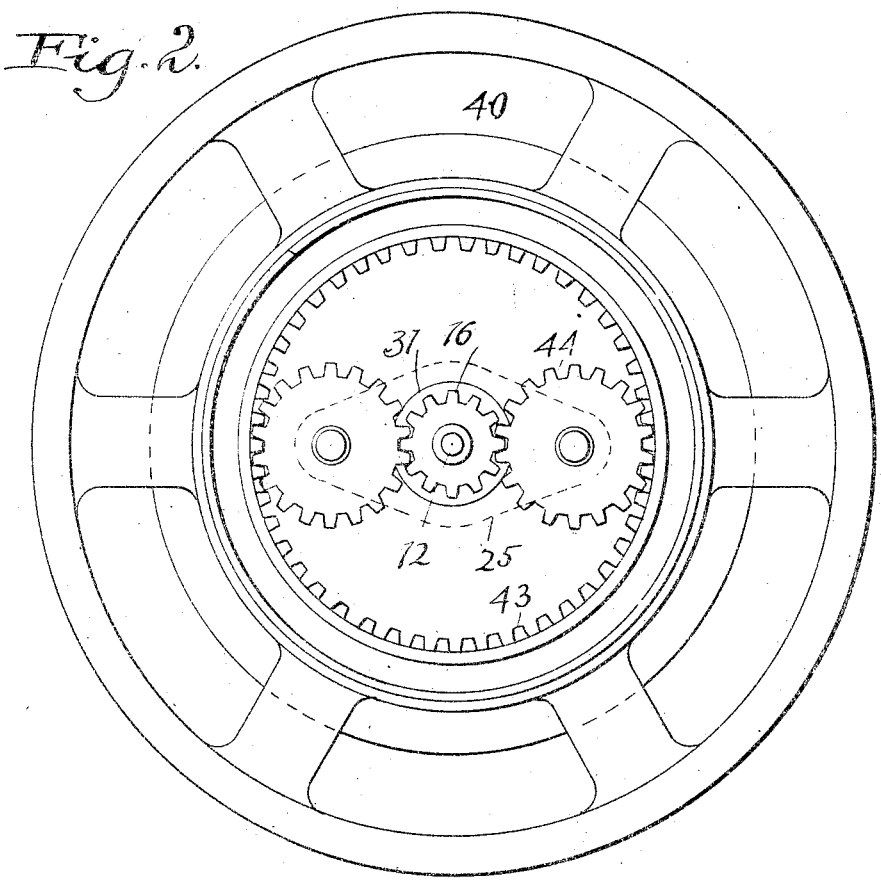
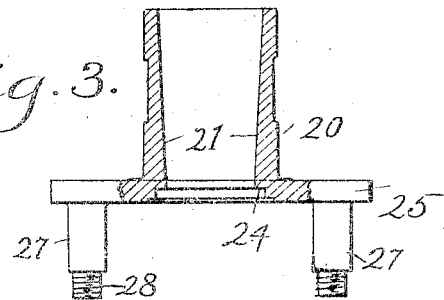
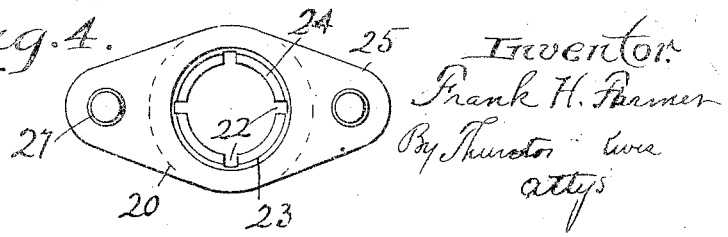

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

AUTOMOBILE TRACTION MECHANISM.

1,305,452.  Specification of Letters Patent.  Patented June 3, 1919.

Application filed June 11, 1917. Serial No. 173,976.

*To all whom it may concern:*

Be it known that I, FRANK H. FARMER, a citizen of the United States, residing at Cleveland, in the county of Cuyahoga and State of Ohio, have invented a certain new and useful Improvement in Automobile Traction Mechanism, of which the following is a full, clear, and exact description.

This invention relates to that kind of automobile traction mechanism in which the non-rotating axle tube is required to rigidly support a gear cage in which an idler gear is mounted for transmitting rotary motion to an internal ring gear fixed to the wheel from a pinion fixed to the rotatable axle shaft, which projects through the axle tube. The gear cage of such traction mechanism is subjected to severe torsional and transverse stresses; but in none of the various forms of such traction mechanism with which I am familiar has the gear cage been constructed and connected in such a way as will insure it the necessary strength to resist the stresses for any considerable time without either breaking or becoming in some degree bent out of the exact position which it must occupy in order that the mechanism shall operate effectively.

The principal object of this invention is to so construct the gear cage and connect it to the axle tube as that, when associated with the other necessary mechanism, it will be capable of resisting the stresses of practical use. The construction by which this principal object is attained is also capable of coöperating efficiently with other characteristics of construction which in a high degree increase the efficiency and durability of the traction mechanism. The object of the invention generally is to produce a strong, durable, construction of the class referred to.

Generally speaking, the invention resides in the construction and combination of parts hereinafter described and definitely pointed out in the appended claims.

In the drawing, Figure 1 is a sectional side elevation of the outer end of a rear axle and the associated mechanism in which this invention is embodied; Fig. 2 is an outside view of the mechanism shown in Fig. 1 with the cover plate removed; Fig. 3 is a side elevation partly sectioned of the gear cage sleeve, and Fig. 4 is an outside end view thereof.

Referring to the parts by numerals, 10 represents one of the axle tubes of the driving axle of a motor vehicle; and 12 the live axle or driven axle shaft which extends through this axle tube and to which rotary motion is usually imparted by differential gearing mounted in this driving axle. The outer end of this axle tube is slightly tapered as shown at 13. In this tapered surface one or more, preferably four, longitudinally extended non-tapered keyways 14 are formed.

20 represents the gear cage sleeve. This is internally tapered at 21 to enable it to tightly fit the tapered end of the axle tube. In its inner periphery are longitudinally extended non-tapered keyways 22.

When this sleeve is put onto the axle tube it is driven on until the engagement of said tapered surfaces bring about a tight fit as between the axle tube and sleeve. The keys 25 which are driven into the keyways of both the axle tube and sleeve insure that said sleeve shall not turn on the axle tube.

In the outer end of the bore of the sleeve is a rabbeted annular recess 23 for the reception of the flange 31 on the sleeve nut 30 that is screwed into the internally threaded end of the axle tube. The flange 31 by engaging with the annular shoulder 24 prevents any outward movement of the sleeve on the axle tube and keeps it in the tightly fitting position. Likewise this flange by engaging the ends of the keys keep them in operative position.

This sleeve 20 is a part of the gear cage; and in order that it may be such it is formed with an outwardly extended flange 25 at its outer end. The other member of the gear cage is a plate 26; and this is rigidly fixed to the flange 24 in spaced parallel relation thereto. To accomplish this the flange 25 is provided with the distance studs 27. These are shown to be and preferably should be integral parts of the flanged sleeve 20. The outer threaded ends 28 of these studs receive nuts 29 which lock this plate 26 to the flange sleeve to form a strong rigid gear cage.

The traction wheel 40 is rotatably mounted on sleeve 20 by means of two annular ball bearings of known construction. The inside ring 50 of the outer bearing abuts the flange 25 which in the described construction is strong enough to withstand the thrust against it. A distance sleeve 52 embraces sleeve 20 and engages the bearing ring 50 to hold it against said flange. The inside bearing ring 54 of the other annular bearing is fitted on sleeve 20 and it engages the distance sleeve 52. It is held against sleeve being engaged by the hub 60 of the brake bracket 61, which hub is cylindrical and is rigidly fixed to the axle tube.

The outside rings of the two annular bearings are fitted into the hub of the wheel. The outside ring 56 of the inner annular bearing engages a shoulder 57 on the wheel and is held against that shoulder by a washer 58 having a threaded periphery which screws into the threaded outer end of the wheel hub. This washer embraces the hub 60 and contains an annular groove in which is a washer of felt or other material which will form a lubricant and dust tight joint around said hub 60.

The remainder of the mechanism as shown is not original with me, and therefore requires little description. The part of the wheel hub on the outer side of the wheel is made large enough to contain the gear cage. It carries an internal gear 43 which is in constant mesh with one or more idler gears 44 which are mounted in the gear cage; and these are in constant mesh with the pinion 16 that is fixed to the outer end of the live axle 12.

A plate 63 is secured to the outer end of the wheel hub so as to inclose a chamber in which the gear cage and associated parts above described are inclosed.

Having described my invention, I claim:—

1. In automobile traction mechanism, the combination of an axle tube, a gear cage sleeve tightly fitted onto the outer end of said axle tube, a key engaging said axle tube and sleeve to prevent the rotation of the sleeve upon the axle tube, a gear cage rigidly connected with the outer end of said gear sleeve, a concentric traction wheel, an internal ring gear fixed to said wheel, an idler gear mounted in said gear cage, a driven axle shaft which projects through said axle tube, a pinion on said axle shaft in mesh with said idler gear, bearings for said traction wheel comprising two anti-friction ring bearings, the inside ring of both of said ring bearings being fitted upon said gear cage sleeve, and said sleeve having a shoulder against which one of said rings abuts, a spacing sleeve which embraces the gear cage sleeve and lies between and engages said two inside bearing rings, and a brake bracket sleeve which is fitted upon and firmly secured to the axle tube in engagement with the adjacent inner bearing ring.

2. In automobile traction mechanism, the combination of an axle tube, a gear cage sleeve tightly fitted on to the outer end of said axle tube, a key engaging said axle tube and sleeve to prevent the rotation of the sleeve upon the axle tube, a gear cage rigidly connected with the outer end of said gear sleeve, a concentric traction wheel, an internal ring gear fixed to said wheel, an idler gear mounted in said gear cage, a driven axle shaft which projects through said axle tube a pinion on said axle shaft in mesh with said idler gear, bearings for said traction wheel comprising two anti-friction ring bearings,—the inside ring of both of said ring bearings being fitted upon said gear cage sleeve, a spacing sleeve which embraces the gear cage sleeve and lies between and engages said two inside bearing rings, a brake bracket sleeve which is fitted upon and firmly secured to the axle tube in engagement with the adjacent inner bearing ring, and an annular disk which screws into the inner end of the wheel hub and has a dust and lubricant tight joint between itself and the hub of said brake bracket.

In testimony whereof I hereunto affix my signature.

FRANK H. FARMER.

Witnesses:
H. C. McGory,
F. H. Stetzel.